Feb. 3, 1953  C. JUNKER  2,627,442
ENDLESS TREAD TRACTION ATTACHMENT FOR VEHICLES
Filed Jan. 28, 1952  2 SHEETS—SHEET 1

Christ Junker
INVENTOR.

BY Clarence A. O'Brien
and Harvey B. Jacobson
Attorneys

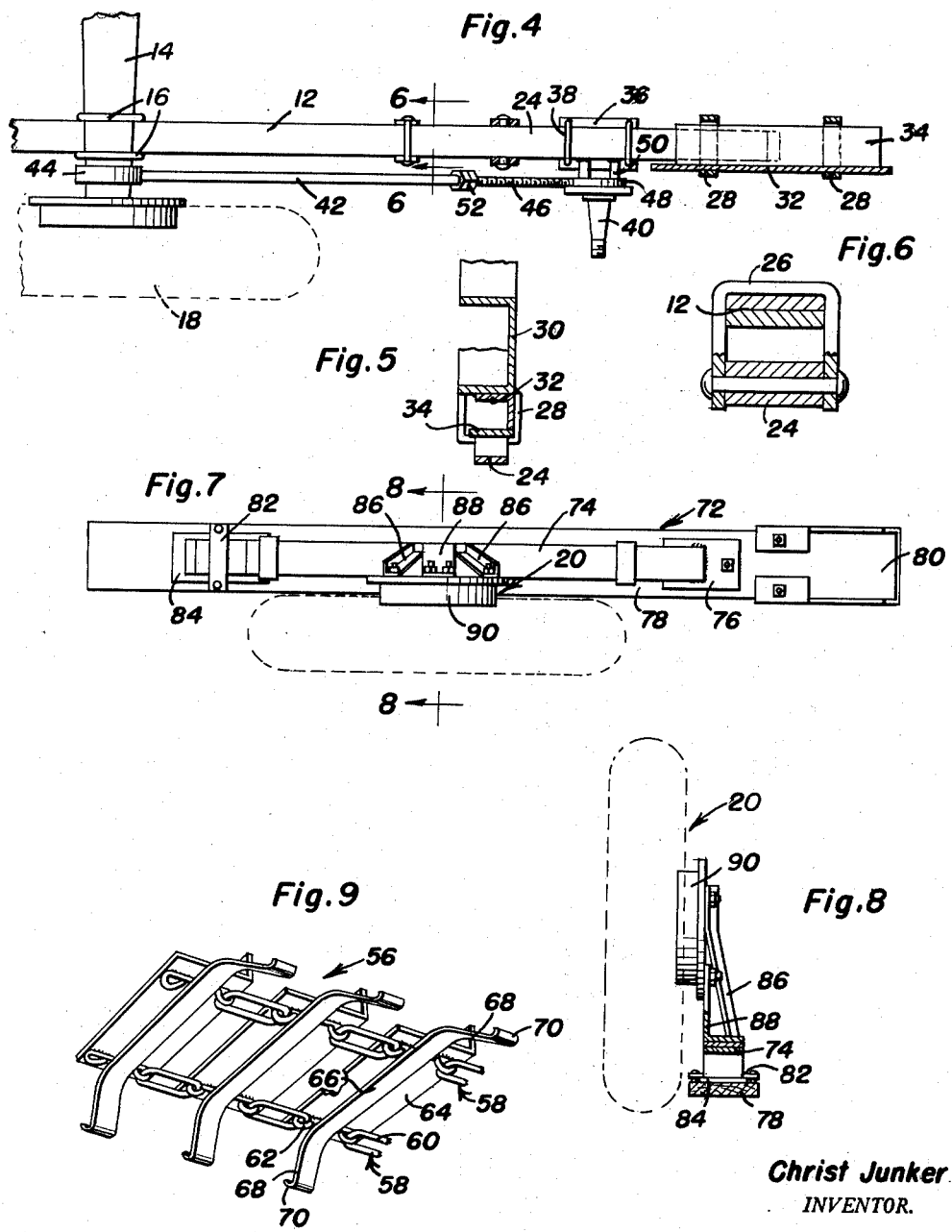

Patented Feb. 3, 1953

2,627,442

UNITED STATES PATENT OFFICE 2,627,442

ENDLESS TREAD TRACTION ATTACHMENT FOR VEHICLES

Christ Junker, Kintyre, N. Dak.

Application January 28, 1952, Serial No. 268,580

6 Claims. (Cl. 305—8)

This invention relates to new and useful improvements in vehicles and the primary object of the present invention is to provide a sleigh attachment for vehicles, whereby a vehicle may move over snow or ice.

Another important object of the present invention is to provide a sleigh attachment for vehicles including an auxiliary wheel mount that is adjustable toward and away from a rear axle, whereby tightening of endless traction members about the rear wheels and the auxiliary wheels may be readily accomplished.

A further object of the present invention is to provide a sleigh attachment for vehicles including novel and improved skids that are quickly and readily attached to or removed from the front wheel assemblies of a vehicle in a convenient manner.

A still further aim of the present invention is to provide a sleigh attachment for vehicles which is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 4 is a horizontal sectional view taken substantially on the plane of section line 4—4 of Figure 2;

Figure 5 is an enlarged vertical sectional view taken substantially on the plane of section line 5—5 of Figure 2;

Figure 6 is an enlarged detail vertical sectional view taken substantially on the plane of section line 6—6 of Figure 4;

Figure 7 is a plan view of one of the skids and showing the same attached to a forward wheel assembly, in dotted lines;

Figure 8 is a vertical sectional view taken substantially on the plane of section line 8—8 of Figure 7; and, Figure 9 is a fragmentary perspective view of the traction member used in the present invention.

Figure 1:
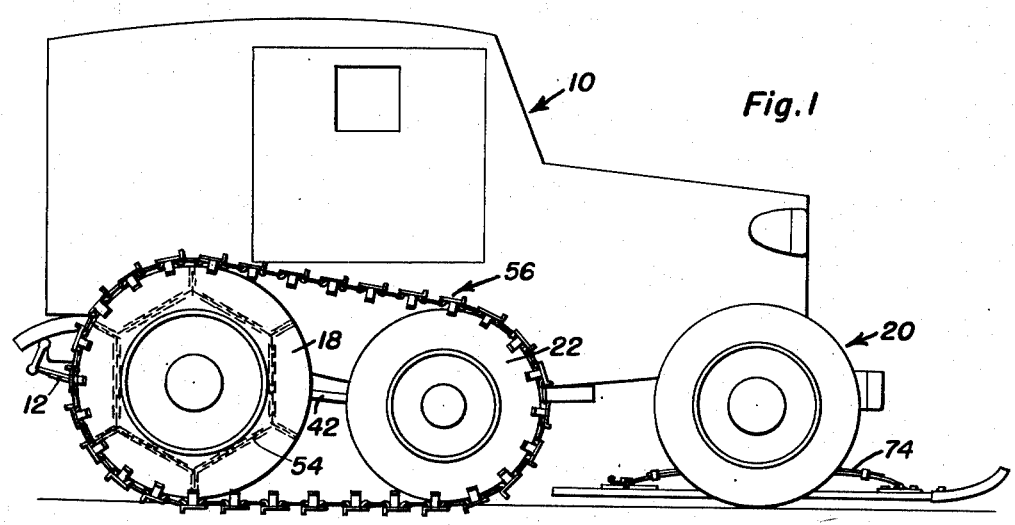
Figure 1 is a side elevational view of a vehicle equipped with the present sleigh attachment.
Figure 2:
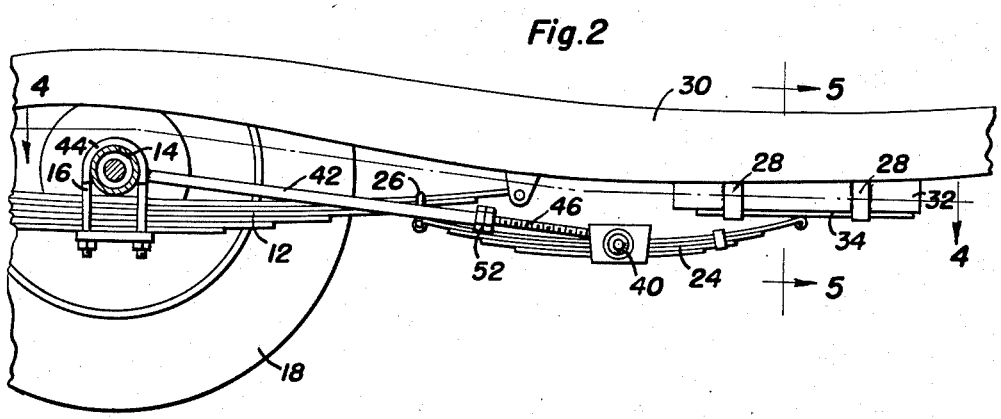
Figure 2 is an enlarged fragmentary detail view of Figure 1 with the facing rear wheel removed and the rear axle shown in section.
Figure 3:
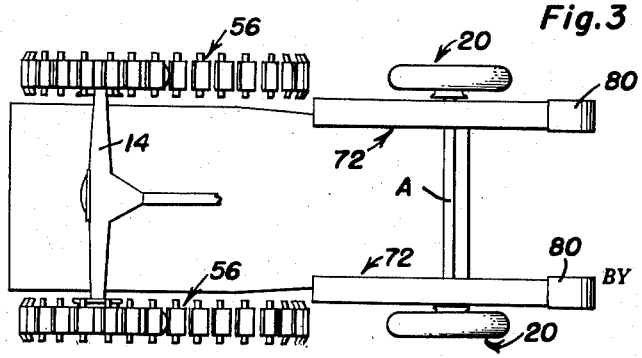
Figure 3 is a diagrammatic bottom plan view of Figure 1 in smaller scale, the auxiliary wheel mount removed.

Referring now to the drawings in detail, wherein for the purpose of illustration, there is disclosed a preferred embodiment of the present invention, the numeral 10 represents a vehicle of known construction having a pair of rear leaf spring assemblies 12 that are secured to a rear axle 14 by U-bolts 16. The ends of axle 14 carry rear wheels 18 that are spaced rearwardly from the forward wheel assemblies 20 of the vehicle.

Auxiliary wheels 22 are applied to the vehicle through the medium of leaf springs or spring members 24. The rear ends of the spring members 24 are secured to U-shaped guide brackets 26 that embrace the forward end portions of the spring assemblies 12 and which are slidably received on the forward end portions of the spring assemblies.

Guides 28 are fixed by welding or the like to the side frame members 30 of the vehicle and extend about angle iron reenforcing bars 32 also fixed to the members 30. Slide plates 34 are slidably supported by the guides 28 under the vertical flanges of bars 32, as shown in Figure 5. The forward ends of the leaf springs 24 are fixed, by welding or the like, to the undersurfaces of the slide plates 34.

Blocks 36 are clamped on the springs 24 by U-bolts 38 and support stub axles 40 or the ends of a single axle, paralleling the rear axle. The wheels 22 are mounted on the stub axles or the ends of the single auxiliary axle.

Means is provided for adjustably connecting the auxiliary axle 40, 40 to the rear axle 14 and this means comprises a pair of rear internally threaded tubular members 42 having channels 44 fixed to their rear ends that engage over the axle 14. Forward threaded rods 46 are threaded in the members 42 and their forward ends are fixed to yokes 48 that engage over spacer and connecting lugs 50 between the stub axles 40 and the blocks 36. Lock nuts 52 are threaded on the rods 46 to retain the members 42 and rods 46 longitudinally adjusted relative to each other.

Tire chains 54 extend circumferentially about the rear wheels 18 and endless traction members 56 extend between and about the wheels 18 and 22. The traction members 56, as shown best in Figure 9, each include a pair of endless chains 58 composed of loops 60 and links 62. The links 62 of the chains 58 are connected by cross-angles or cleats 64 that are welded to the links. The links of the chains are further connected by straps 66 having downwardly inclined end portions 68 whose edges are curved inwardly as at 70. The end portions 68 will engage opposite sides of the wheels 18 and 22 to hold the traction members on the wheels. By adjusting the members 46 in members 42, the wheels 22 will be spaced sufficiently from the wheels 18 to tighten the traction members against the circumference of the wheels.

Skids 72 are attached to the forward wheel assemblies 20 and comprise leaf springs 74 having their forward ends fixed to plates 76 removably secured to runners 78 whose forward ends carry upwardly curved shoes 80. The rear ends of springs 74 are slidably received in guides 82 secured to wear plates 84 removably held on the runners.

Attaching arms 86 and 88 are fixed to the central portions of the springs to the brake drum housings 90 of the wheel assemblies 20 to permit swinging movement of the skids with the wheel assemblies by the steering mechanism, not shown, of the vehicle that is operatively connected to the axle A for the front wheel assemblies.

Having described the invention, what is claimed as new is:

1. A snow vehicle comprising a vehicle having a rear axle and leaf spring assemblies supporting the rear axle, an auxiliary axle paralleling the rear axle, spring members supporting the auxiliary axle, said spring members having forward and rear ends, means slidably securing the forward ends of the spring members to the vehicle, means slidably securing the rear ends of the spring members to the leaf spring assemblies, means adjustably connecting the axles, each of said axles carrying wheels, and endless traction members trained about the wheels of the axles.

2. The combination of claim 1 wherein said connecting means includes a pair of elongated threadingly connected members, a hook secured to one member engaged over the rear axle, the other of said pair of members being secured to the auxiliary axle.

3. The combination of claim 1 wherein said means slidably securing the forward ends of the spring members to the vehicle comprises slide plates fixed to the forward ends of the spring members and guides secured to the vehicle slidably receiving said slide plates.

4. The combination of claim 1 wherein said means slidably securing the rear ends of the spring members to the leaf spring assemblies comprises inverted U-shaped hangers attached to the rear ends of the spring members and disposed about the leaf spring assemblies.

5. In a vehicle including a wheeled frame having rear leaf spring assemblies and a rear axle supported by said assemblies, an auxiliary wheel mount comprising a pair of forward leaf springs having forward ends slidably secured to the frame and rear ends slidably secured to the leaf spring assemblies, an auxiliary axle carried by said leaf springs, and an adjustable connection between said auxiliary axle and said rear axle.

6. In a vehicle including a wheeled frame including rear leaf spring assemblies and a rear axle supported by said assemblies, an auxiliary wheel mount comprising a pair of forward leaf springs having forward and rear ends, means slidably securing the forward ends of the springs to the frame, means slidably securing the rear ends of the springs to the spring assemblies, a stub axle carried by each leaf spring, and means adjustably connecting the stub axles to the rear axle.

CHRIST JUNKER.

REFERENCES CITED

The following references are of record in the file of this patent:

UNITED STATES PATENTS

| Number | Name | Date |
|---|---|---|
| 1,276,035 | Crane | Aug. 20, 1918 |
| 1,335,096 | Dietz | Mar. 30, 1920 |
| 1,383,356 | Weier | July 5, 1921 |
| 1,425,609 | Scholz et al. | Aug. 15, 1922 |
| 1,701,212 | Nickerson | Feb. 5, 1929 |
| 2,314,295 | Wampfler | Mar. 16, 1943 |

FOREIGN PATENTS

| Number | Country | Date |
|---|---|---|
| 558,710 | Germany | Sept. 13, 1932 |